//<!-- -->

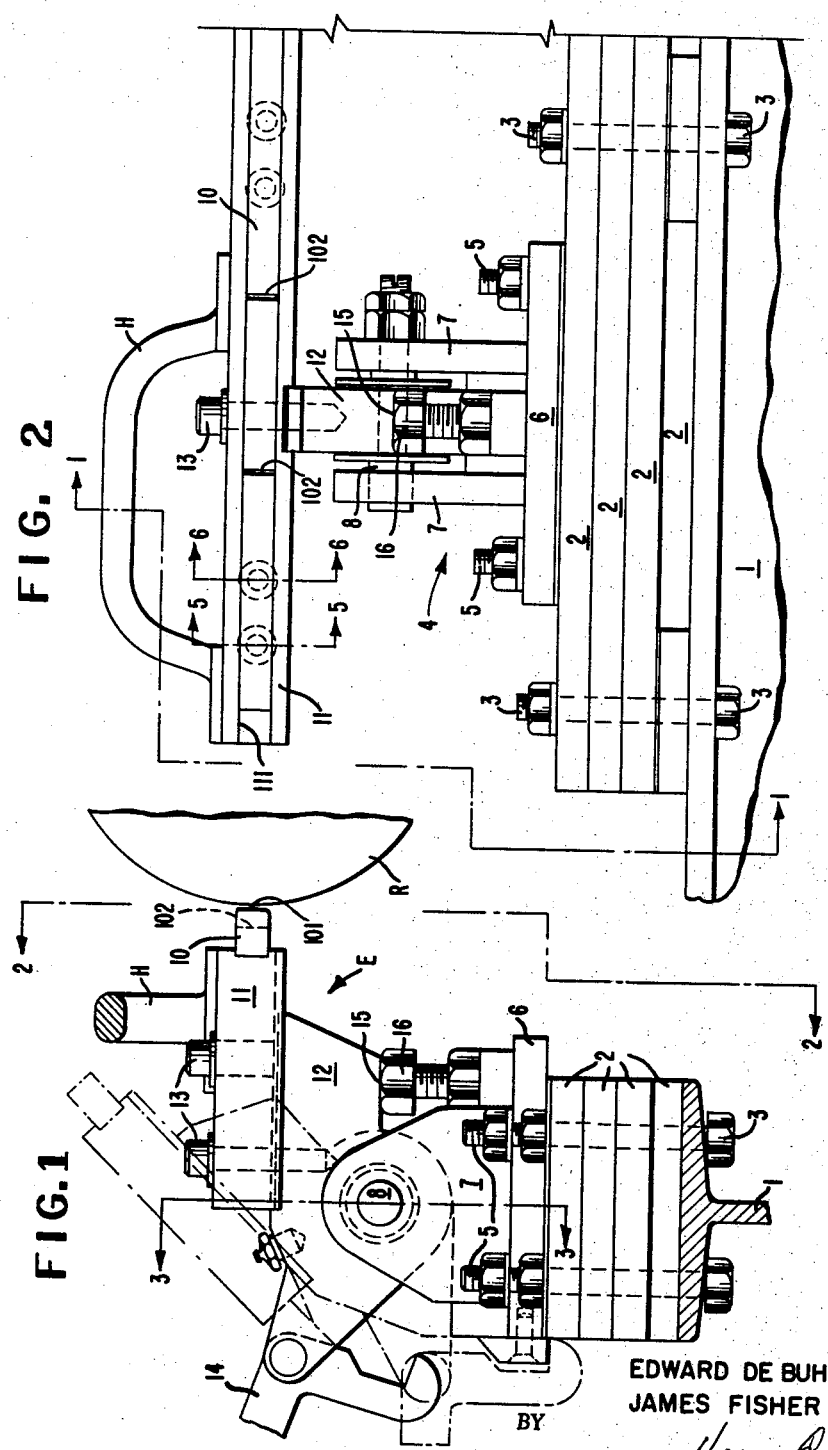

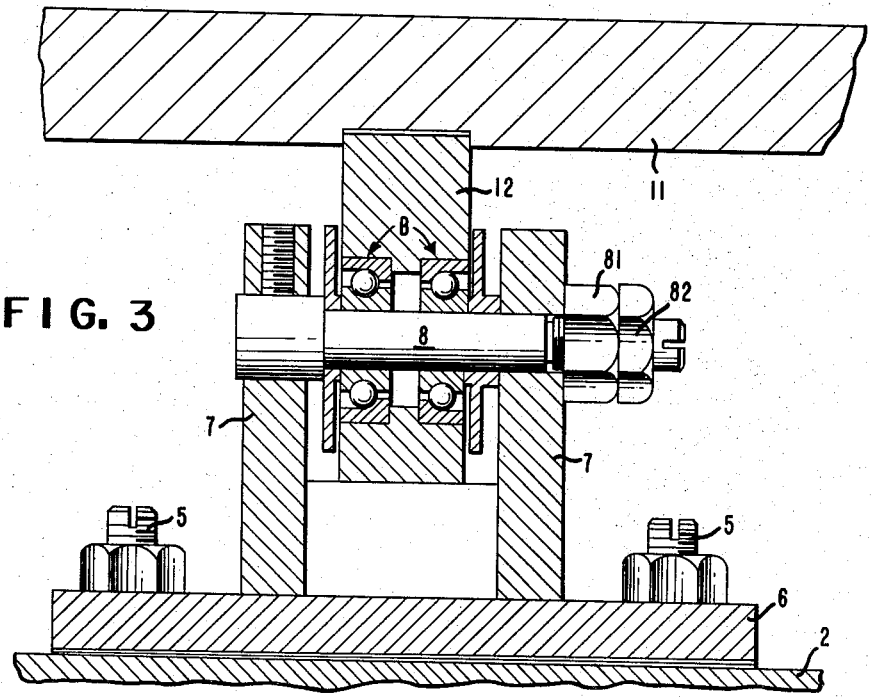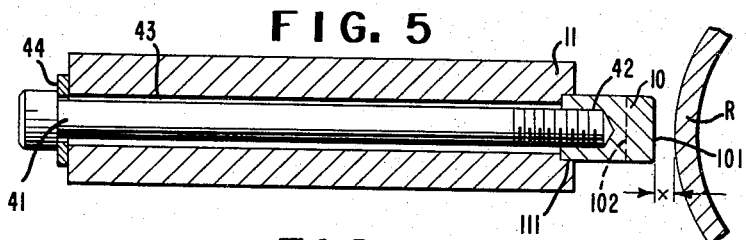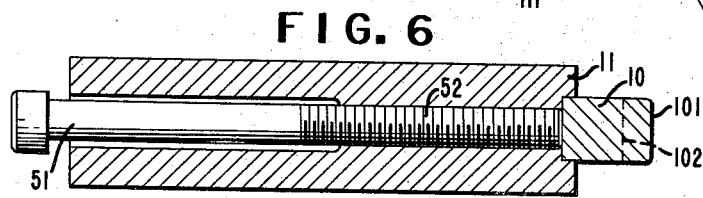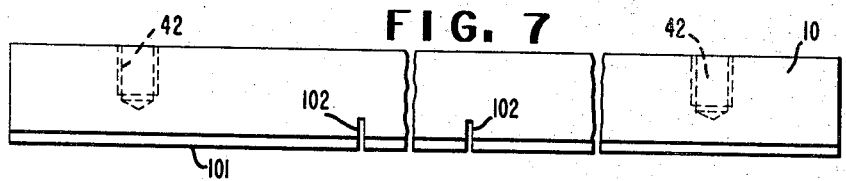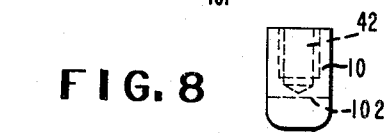

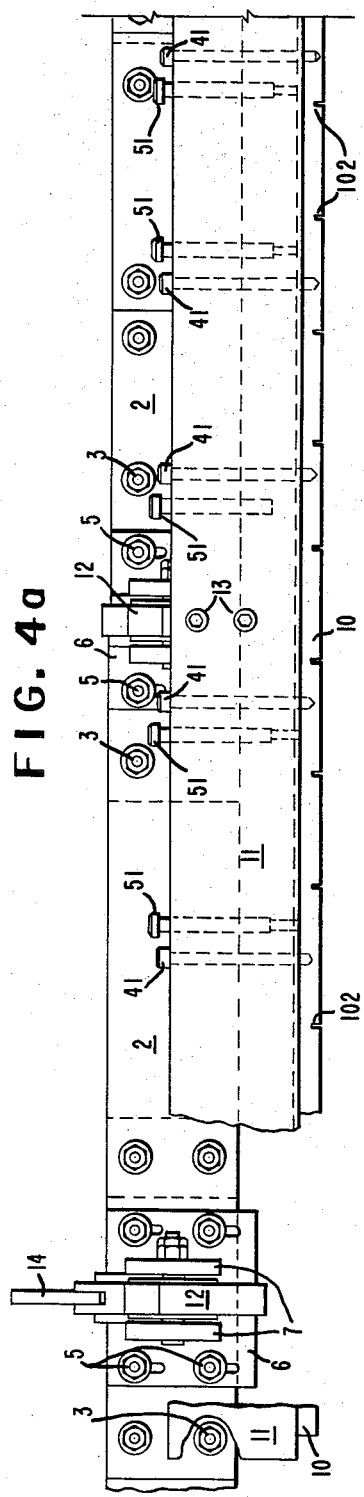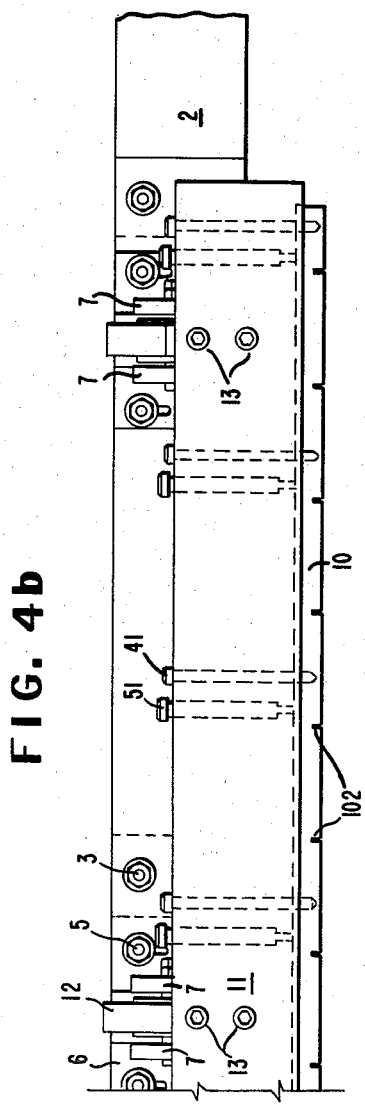

United States Patent Office 3,142,753
Patented July 28, 1964

3,142,753
ELECTRODE MOUNTING ARRANGEMENT FOR ELECTRICAL DISCHARGE TREATMENT OF PLASTIC FILM
Edward De Buhr, Chadds Ford, Pa., and James F. Pfeffer, Jr., Oaklands, Newark, Del., assignors to E. I. du Pont de Nemours and Company, Wilmington, Del., a corporation of Delaware
Filed Jan. 22, 1962, Ser. No. 167,568
3 Claims. (Cl. 250—49.5)

This invention lies in the field of treating plastic films by an electrical discharge.

More specifically it relates to an improved apparatus for continuously treating a moving sheet of material such as polyethylene film, at high speeds with a high frequency, high voltage electrical field and discharge.

There have been a number of undesirable aspects of known apparatus used for such treatments which aspects involve unsatisfactory functioning and problems in maintenance. Usually the electrical discharge treatment of these plastic films is accomplished in an arrangement in which a moving sheet of film is passed around a portion of an elongated rotating roll element and between a narrow gap existing between the surface of the roll element portion and an elongated electrode member operatively aligned therewith, the necessary high voltage conditions being maintained between the roll element and the electrode member to accomplish the desired treatment of the film. In known arrangements of this sort, it has been difficult to establish and maintain the necessarily critical uniform spacing between the electrode member, the film, and the roll element surface, as well as control of the intensity of the electrical field action, under the forces caused by expansion or distortion of parts under the influence of the heat necessarily produced by the treatment, the force of gravity acting upon the parts, and forces of machine vibrations. Also certain difficulties have existed in initially threading a film through such a closely spaced arrangement and also when, due to undesirable sticking of the film to the roll element, the film begins to wrap around the roll element rather than merely passing around it. This latter situation has caused jamming and breakage of parts as the wrapped film rapidly closed the narrow gap between the electrode member and the roll element surface. Movable mountings for electrode members to overcome the jamming problem has been very difficult to accomplish because of the additional tolerances and play introduced which significantly reduce the needed control over the electrode member, roll element spacing and electrical field distribution.

It is one object of this invention to provide a novel and improved apparatus for the electrical discharge treatment of plastic films which substantially eliminates or overcomes the above-discussed difficulties and defects.

It is another object of this invention to provide such an improved arrangement which is relatively simple and economical to construct and maintain, yet effective and reliable in operation.

The objects of the invention are achieved by the improved apparatus of this invention which comprises a special mounting for a particular electrode member, the mounting and electrode member constructed and arranged to permit selective positioning of the electrode member between a first operative film treating position and a non-operative position spaced therefrom, and to permit such positioning while eliminating variations in electrode member roll element spacing and electrical field intensity due to effects of gravity, machine vibrations, and play due to the selective positioning of the electrode member. In addition, distortion of parts due to thermal expansion are substantially eliminated by the construction of the special mounting and the electrode member.

Other objects and advantages will appear from a consideration of the following specification, claims, and accompanying drawings in which:

FIGURE 1 is a partial side elevational view of the special mounting and electrode of this invention showing the position of the roll element and two positions of the electrode. Certain parts are broken away and certain parts are shown in section, as indicated by line 1—1 of FIGURE 2, to simplify the showing, FIGURE 2 is a front elevation of the mounting and electrode of FIGURE 1 taken in the direction of the line 2—2 of FIGURE 1, FIGURE 3 is a sectional view through one of the pivotal support bearings for the electrode mounting as taken on line 3—3 of FIGURE 1, FIGURES 4a and 4b are a top or plan view of the mounting and electrode of FIGURE 1 with portions of structure broken away to more clearly show the one of the pivotal support bearings, FIGURE 5 is a transverse cross sectional view taken through the electrode member and its back up bar at line 5—5 of FIGURE 2, FIGURE 6 is a transverse cross sectional view similar to FIGURE 5, but taken at line 6—6 of FIGURE 2, FIGURE 7 is a partial plan view of the electrode member itself, and FIGURE 8 is an end view of the electrode member of FIGURE 7.

Referring to the drawings, FIGURE 1 shows the position of the roll or electrode element R with respect to the movable electrode assembly E. Rigidly secured to and supported on an I beam member 1 of a machine frame structure are a plurality of elongated electrical insulator plates 2 which are secured in position by machine bolts 3.

A plurality of aligned mounting brackets 4 are mounted on plates 2 by machine bolts 5. Brackets 4 comprise base plates 6 through which bolts 5 pass, and which are provided with pairs of opposed upstanding lugs 7. Supported in each pair of lugs 7 is a shaft or axle element 8 upon which elements is pivotably mounted the movable electrode assembly E. Movable electrode assembly E comprises an elongated electrode element 10 mounted in a rigid holder member 11. Holder member 11 is pivotally connected to shaft elements 8 by a plurality of lugs 12 bolted to the holder member by bolts 13 and rotatably received on the shaft elements 8 by means of bearings B shown in FIGURE 3.

A handgrip H is secured to holder member 11 to provide for manually pivoting the movable electrode assembly about the shaft elements 8, between its operative position shown in solid lines in FIGURE 1 and its inoperative position shown in broken lines in FIGURE 1. Assembly E is provided with a releasable latch 14 for securing the assembly in inoperative position, and with limit stop abutments 15 which cooperate with an adjustable limit stop bolts 16 mounted as shown on stationary mounting brackets 4.

Suitable electrical connections of a conventional type (not shown) are made to roll element R and electrode assembly E to maintain the desired electrical high potential between them.

In apparatus representing the preferred embodiment of this invention the electrode or roll element R is mounted with its axis substantially horizontal and elongated electrode element 10 is about 72" long and provided with a longitudinal planar face 101 preferably about .25" wide which is vertical in the operative position of the electrode assembly, aligned parallel with the roll axis, lying substantially in the same horizontal plane therewith, and uniformly spaced from the surface of the roll R a constant distance X along its length to generally define the electrical discharge gap as shown in FIGURE 5.

Electrode element 10 is an elongated bar preferably formed of a metallic material having a very low coefficient of expansion compared to the material of holder member 11 which is preferably formed of steel.

The face 101 of electrode element 10 is provided with a plurality of evenly longitudinally spaced transverse slots 102 perpendicular to the planar face. These slots in the preferred arrangement are about 0.25" deep by 0.010" wide and are spaced about 3.5" apart and serve to provide a means of thermal expansion along the face 101 without significantly bending the electrode element 10.

Electrode element 10 is slidably received in a longitudinal groove 111 in holder member 11 and secured in position in this groove by a plurality of long small cross section bolts 41 threaded into longitudinally spaced sockets 42 in electrode element 10. Bolts 41 are loosely received in oversize transverse passageways 43 formed in holder member 11 with the bolt heads engaged against washers 44 to hold the electrode element 10 in the groove 111. A plurality of adjusting screws 51 are threadably received at 52 in holder member 11 parallel to and spaced between bolts 41. Screws 51 are maintained in engagement with the electrode element 10 to adjust the planar face 101 thereof into desired relationship with respect to the surface of roll R.

Holder member 11 is an elongated bar preferably formed of steel and having a moment of inertia many times greater than the electrode element so that it can provide substantial restraint to distortion of the electrode element due to thermal gradients. Each point along the electrode element 10 in contact with the holder member 11 is free to move longitudinally along the member a limited distance provided for by the clearance between bolts 41 and oversize passageways or holes 43 and/or bending of the small cross section bolts 41.

As mentioned above the movable electrode assembly is pivotally supported at a plurality of bearings B. These bearings are mounted in double sets of angular contact ball bearings as shown in FIGURE 3. With such bearings the bearings are adjustably preloaded by manipulation of nuts 81 and 82 so that all clearance and play is removed.

It is believed to be clear from the foregoing description that the electrode assembly can be moved into operative position with respect to roll R by actuation of handle H and the electrode element accurately aligned and spaced from the surface of the roll by means of bolts 41 and screws 51. Movement of this assembly is easily accomplished for string-up of the equipment and for clearing jams mentioned earlier. The slotted face 101 and slidable mounting of element 10 in holder member 11 accommodate expansion of the face 101 due to heating by the electrical discharge occurring between the face and the surface of roll R in a way which minimizes distortion of the electrode element and variation in the electrode element-roll spacing; yet does not interfere to any significant degree with the required even distribution of the discharge along element 10. The described relationship of vertical face 101 (in the operative position of the movable electrode assembly) to the closest point of approach of the roll R insures that the spacing and length of electrical discharge between the face and the roll will not change under vertical sagging of the holder and electrode element relative to the roll R due to the effects of gravity or machine vibration, which by the configuration of the electrode and holder will occur predominantly in the vertical direction as to these parts.

It can be seen that applicants have provided an improved apparatus for electrical discharge treatment of films in which the adverse effects of thermal expansion, gravity, machine vibrations, and bearing play on electrode spacing have been substantially eliminated or reduced.

Various modifications within the spirit of this invention will occur to those skilled in the art and it is intended that all such are to be included within the scope of the following claims.

We claim:
1. An improved electrode mounting arrangement for electrical discharge treatment of plastic film, said arrangement comprising a supporting frame member, an electrode holder member pivotally mounted on said frame member and electrically insulated therefrom, a first elongated electrode element having a relatively low coefficient of thermal expansion secured to said holder member and movable therewith, said movable electrode element provided with a longitudinally extending normally vertical planar surface, said holder member having a moment of inertia many times greater than said movable electrode element and a coefficient of thermal expansion greater than that of the movable electrode element, said holder member and movable electrode pivotally mounted for movement between an operative position in which the movable electrode element is positioned in closely spaced relationship adjacent to a cooperating aligned parallel second electrode element such that a moving sheet of film may be passed between said elements and a surface of such film treated by an electrical field and discharge created between the electrode elements, the elements positioned in said operative position such that the electrode elements lie substantially in the same horizontal plane with said planar surface lying in a vertical plane and parallel to said second electrode; and an inoperative position spaced a substantial distance from said operative position and said second electrode, said holder member and said movable electrode element provided with cooperating means for adjustably securing said movable electrode element to said holder member and permit selective infinitely variable adjustment of the alignment and spacing of said first movable electrode element with respect to the second electrode while simultaneously permitting continuous limited longitudinal sliding action of said movable electrode element relative to said holder member under forces of thermal expansion due to an electrical discharge between the planar face of the movable electrode element and the second electrode element in order to prevent significant distortion of said planar face, said holder member provided with an actuating means for moving the member between the operative and inoperative positions, and further provided with a releaseable latch means for securing said member in said inoperative position, said holder member pivotally mounted on said frame member by a plurality of adjustable pre-loaded double ball bearing assemblies acting between said members to eliminate lost motion during pivotal movement between them.

2. The improved arrangement of claim 1 in which said movable electrode planar surface is provided at longitudinally spaced intervals with a plurality of transversely extending slots substantially perpendicular to said surface to accommodate thermal expansion of the electrode element material forming said surface without general distortion of said surface out of its planar configuration.

3. The improved arrangement of claim 2 in which said frame member and said holder members are provided with adjustable interengageable means for positively limiting pivotal movement between them.

References Cited in the file of this patent
UNITED STATES PATENTS

| | | |
|---|---|---|
| 2,844,731 | Plonsky et al. | July 22, 1958 |
| 2,881,470 | Berthold et al. | Apr. 14, 1959 |
| 2,882,412 | Cunningham | Apr. 14, 1959 |